United States Patent
Widzgowski

(10) Patent No.: US 9,575,300 B2
(45) Date of Patent: Feb. 21, 2017

(54) CONFOCAL LASER SCANNING MICROSCOPE HAVING A LASER LIGHT SOURCE TO WHICH PULSED CONTROL IS APPLIED

(71) Applicant: Leica Microsystems CMS GmbH, Wetzlar (DE)

(72) Inventor: Bernd Widzgowski, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 14/426,260

(22) PCT Filed: Sep. 4, 2013

(86) PCT No.: PCT/EP2013/068286
§ 371 (c)(1),
(2) Date: Mar. 5, 2015

(87) PCT Pub. No.: WO2014/037401
PCT Pub. Date: Mar. 13, 2014

(65) Prior Publication Data
US 2015/0212306 A1 Jul. 30, 2015

(30) Foreign Application Priority Data

Sep. 7, 2012 (DE) .......................... 10 2012 215 932
Oct. 12, 2012 (DE) .......................... 10 2012 218 624

(51) Int. Cl.
*G02B 21/00* (2006.01)
(52) U.S. Cl.
CPC ....... *G02B 21/0032* (2013.01); *G02B 21/0096* (2013.01)

(58) Field of Classification Search
CPC ......................... G02B 21/0032; G02B 21/0096
USPC .......................................................... 359/385
See application file for complete search history.

(56) References Cited

U.S. PATENT DOCUMENTS

| | | | |
|---|---|---|---|
| 6,426,490 B1 | 7/2002 | Storz | |
| 6,521,899 B1 | 2/2003 | Wolleschensky | |
| 7,477,449 B2 | 1/2009 | Knebel et al. | |
| 2003/0156323 A1* | 8/2003 | Overbeck | G02B 21/002 359/385 |
| 2004/0204652 A1 | 10/2004 | Zavislan et al. | |
| 2005/0012993 A1 | 1/2005 | Araya | |
| 2005/0058372 A1 | 3/2005 | Engelmann et al. | |
| 2007/0081234 A1* | 4/2007 | Widzgowski | G02B 21/0032 359/385 |

(Continued)

FOREIGN PATENT DOCUMENTS

| | | |
|---|---|---|
| DE | 102 53 108 A1 | 5/2004 |
| DE | 102007002203 | 7/2008 |

*Primary Examiner* — Frank Font
(74) *Attorney, Agent, or Firm* — Hodgson Russ LLP

(57) ABSTRACT

The present invention relates to a confocal laser scanning microscope (100) having an illumination device (1) that comprises a laser light source (41) that is configured to illuminate a sample (25), and a control application circuit (40) for the laser light source (1) which is configured to output a pulsed control application signal (48) in order to supply the laser light source (41), the control application circuit (40) being configured so that it determines both a pulse amplitude (A) and a pulse width (W) of at least one pulse of the pulsed control application signal (48) as a function of at least one input variable (S).

11 Claims, 2 Drawing Sheets

(56) References Cited

U.S. PATENT DOCUMENTS

2009/0097108 A1*  4/2009  Fox .................... A61B 5/0062
                                                    359/385
2011/0149290 A1*  6/2011  Schulte ............. G02B 21/0032
                                                    356/445
2011/0296562 A1   12/2011 Beaurepaire et al.

* cited by examiner

CONFOCAL LASER SCANNING MICROSCOPE HAVING A LASER LIGHT SOURCE TO WHICH PULSED CONTROL IS APPLIED

CROSS-REFERENCE TO RELATED APPLICATIONS

The present application is the U.S. national phase of International Application No. PCT/EP2013/068286 filed Sep. 4, 2013, which claims priority of German Application No. 10 2012 215 932.0 filed Sep. 7, 2012 and German Application No. 10 2012 218 624.7 filed Oct. 12, 2012, the entirety of each of the foregoing applications being incorporated herein by reference.

FIELD OF THE INVENTION

The present invention relates to a confocal laser scanning microscope having a laser light source, and to a method for adjusting the intensity of a laser light source in a confocal laser scanning microscope.

BACKGROUND OF THE INVENTION

The present invention is in the field of confocal laser scanning microscopy (CLSM), for example as described in U.S. Pat. No. 7,477,449 B2. For image generation in this context, a location on the sample to be observed is illuminated with a focused laser beam, and the reflected or fluorescent light proceeding from there is sensed by a sensor likewise focused on that location, with the result that high resolution can be achieved.

The laser that is used has a crucial influence on image quality. In particular, its intensity should be controllable as exactly as possible and should cover a wide range of intensities, so that it can also be used for as many different fluorescent dyes or fluorochromes as possible. A modulation frequency as high as the one-MHz frequency range is desirable. In addition, the minimal achievable intensity should be as close to zero as possible. In the context of switch-on and switch-off operations, overshoots or undershoots of the delivered power level should be as few as possible.

It is therefore desirable to improve intensity regulation of the laser light source of a confocal laser scanning microscope.

SUMMARY OF THE INVENTION

The present invention proposes a confocal laser scanning microscope as well as a method for regulating the light intensity of a laser light source in a confocal laser scanning microscope, having the features described herein. Advantageous embodiments are the subject matter of the description that follows.

Advantages of the Invention

In the context of the invention, a confocal laser scanning microscope is equipped with a laser light source, preferably a laser diode, to which pulsed control is applied. Pulsed control application offers multiple degrees of freedom, of which at least a pulse amplitude and a pulse width are used in the context of the invention. The invention improves control quality and control dynamics and expands the brightness range available, in particular down to low light intensities, and improves wavelength stability.

The invention offers particular advantages especially as compared with continuous control application. A modulation frequency as high as the one-MHz frequency range, or higher, is enabled. In addition, the minimum achievable intensity is close to zero. Almost no overshoots or undershoots of the delivered power level occur in the context of switch-on and switch-off operations. In addition, the signal-to-noise ratio is improved in particular for low intensities.

The use of two degrees of freedom enables particularly good adaptation to the particular sample, for example to a particular fluorochrome being used, or to a permissible thermal input.

The invention makes possible a broad control application spectrum. The light quantity radiated onto the sample is the integral of the light intensity over the irradiation duration. The control application circuit is configured so that the laser light source is supplied with a control application signal of adjustable intensity and duration. The duration of the current can be adjusted down to less than 100 ps. A maximum duration up to continuous operation is possible. The duration of the current pulse can be adjusted variably, and preferably also externally substantially continuously (or in very small digital adjustment steps). It is furthermore possible to adjust the pulse amplitude. Preferably a lower amplitude threshold value (called the "laser threshold" or "threshold current intensity") is specified, below which reliable emission of laser light is not guaranteed. The control application circuit is preferably configured so that the value does not fall below this threshold.

For a further reduction in the delivered light power level at the laser threshold, the pulse duty factor or pulse width is available as a degree of freedom.

In the context of the invention, an at least two-dimensional characteristics field can be constructed from the pulse amplitude and pulse width, each value pair characterizing an average light intensity or light quantity. For each desired light intensity or light quantity, at least one vector or value pair of pulse amplitude and pulse width can therefore be found. Usually, however, multiple suitable value pairs will be present in the characteristics field, so that further boundary conditions, for example an intensity noise, a specific power uptake of the system, a maximum excitation efficiency, a minimum sample bleaching, a particular suitability for a specific fluorescent dye, and so forth, can also be taken into consideration.

Particularly advantageously, the sensing of measured light is also adapted to the time-related profile (pulse width and/or frequency) of the control application signal. The control application circuit therefore preferably comprises an input and/or output (e.g. TTL or switch contact) for a pulse frequency of the control application signal. The pulse frequency as a result can be specified from outside, for example by a measurement device, or the pulse frequency can be specified toward the outside, for example to the measurement device. In both cases a tuning of an excitation frequency to a sensing frequency or scanning frequency is possible, with the result that, in particular, moiré artifacts during sensing can be avoided.

Further advantages and embodiments of the invention are evident from the description and the appended drawings.

It is understood that the features recited above and those yet to be explained below are usable not only in the respective combination indicated, but also in other combinations or in isolation, without departing from the scope of the present invention.

The invention is schematically depicted in the drawings on the basis of an exemplifying embodiment, and will be described in detail below with reference to the drawings.

DETAILED DESCRIPTION OF THE INVENTION

Figure 1:
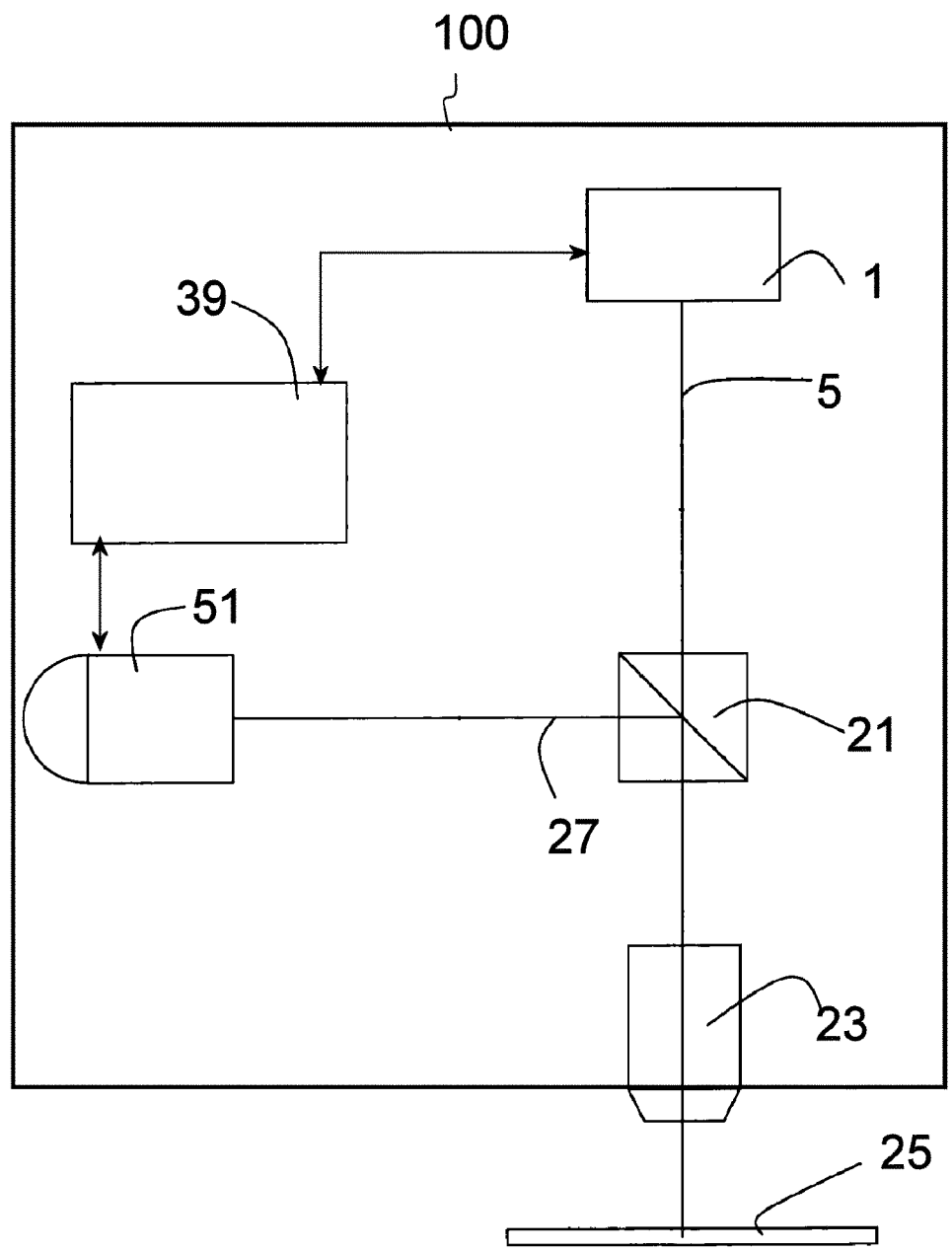
FIG. 1 schematically shows a beam path in a confocal laser scanning microscope, according to a preferred embodiment of the invention.
Figure 2:
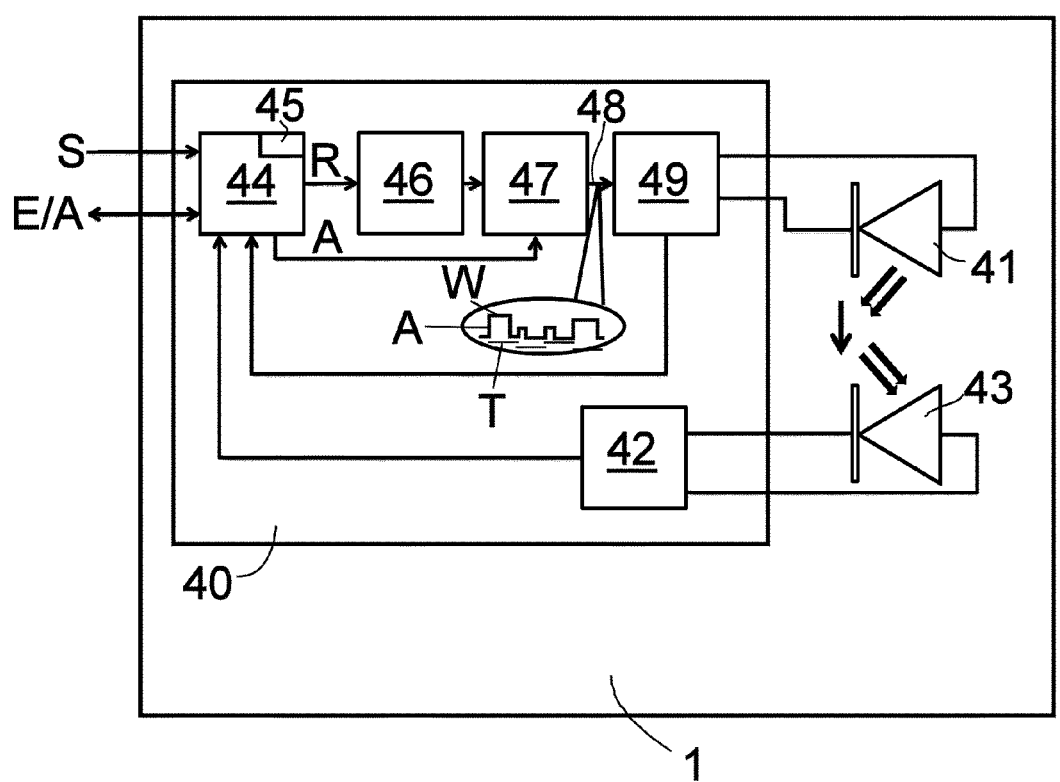
FIG. 2 schematically shows a preferred embodiment of an illumination device of a confocal laser scanning microscope according to the present invention.

FIGS. 1 and 2 will be described together; in FIG. 1 a preferred embodiment of a confocal laser scanning microscope according to the present invention is schematically depicted and is labeled in its entirety as 100, and in FIG. 2 illumination device 1 that is preferred in the context of the present invention is depicted in greater detail in the manner of a circuit diagram.

The microscope comprises an illumination device, labeled 1, that comprises a laser light source 41 embodied as a laser diode. Laser light source 41 emits an illumination light beam 5 that passes through a beam splitter 21 and an objective 23 and strikes a sample 25.

Measured light 27 reflected from the sample or generated by fluorescence enters through objective 23 and is coupled out at beam splitter 21 into an observation beam path and conveyed to a detector 51.

Also provided in illumination device 1 is a control application circuit 40 that supplies laser diode 41 with current. Control application circuit 40 is configured to receive a target light quantity as a target value, and to process it. In the present example the target value is furnished by a computation unit 39 that is configured to control microscope 100. Measured data from detector 51 are furthermore transferred to computation unit 39 and evaluated therein. Computation unit 39 also applies control to detector 51.

Control application circuit 40 comprises multiple functional units that will be explained below. One circuit section 44 is embodied as a control circuit section, e.g. ASIC or FPGA, and is embodied and configured to control the control application circuit 40. Control circuit section 44 comprises an input for an input variable S, as well as a terminal E/A for a frequency signal, which in the embodiment shown are connected to computation unit 39. A target value signal constituting an input variable S, here a target intensity or target light quantity, is conveyed to the input. As will be explained later, terminal E/A can serve to improve the operation of detector 51.

Control circuit section 44 is configured to identify, from a delivered target light quantity on the basis of a characteristics field 45 in particular stored in control circuit section 44, a respective target value for a pulse duty factor R (ratio of pulse width W to pulse period length T) and for a pulse amplitude A.

The target value R for the pulse duty factor is conveyed to a PWM circuit section 46, which generates a PWM signal therefrom.

The target value for the pulse amplitude A is conveyed to a PAM circuit section 47 together with the PWM signal generated by PWM circuit section 46, from which PAM circuit section 47 generates a control application signal 48, generated in the context of the invention with a variable pulse width W or pulse duty factor R and a variable pulse amplitude A, which signal is delivered via a current measurement circuit section 49 to laser diode 41.

Current measurement circuit part 49 is used as part of a laser regulation system implemented according to the preferred embodiment depicted here. Illumination device 1 additional comprises, for feedback or measurement of illumination light 5 in the context of laser regulation, a photodiode 43 and a photomeasurement circuit 42. A small portion of illumination light 5 is coupled out to photodiode 43. Control circuit section 44 can regulate the generation of the control application signal 48 via the fed-back values for current, intensity, and light quantity.

The invention makes it possible to adjust the pulse amplitude and pulse width in controlled fashion for each pulse of control application signal 48, and thus to specify an average light intensity and light quantity for illumination beam 5. Very low average intensities and light quantities can also be achieved in the context of the invention, in particular by reducing the pulse width.

In order to improve the measurement of measured light 27 and thus to improve the overall functionality of microscope 100, control application circuit 40 is connected via terminal E/A to computation unit 39 and transfers via terminal E/A, constituting an output, a frequency signal that describes the frequency of control application signal 48. This allows computation unit 39 to carry out measurement using detector 51 at a scanning frequency that depends on the frequency of control application signal 48, so as thereby, for example, to avoid moiré measurement artifacts. Alternatively or additionally, terminal E/A can serve as an input, or one terminal can respectively serve as an output and as an input. In the case of an input, the frequency of control application signal 48 would be specified as a function of the scanning frequency. In both cases what is usefully achieved is that the frequency of the control application signal 48 is an integral multiple (1, 2, 3, . . . ) of the scanning frequency.

What is claimed is:

1. A confocal laser scanning microscope having an illumination device that comprises a laser light source that is configured to illuminate a sample, and a control application circuit for the laser light source which is configured to output a pulsed control application signal in order to supply the laser light source, the control application circuit being configured so that it determines both a pulse amplitude and a pulse width of at least one pulse of the pulsed control application signal as a function of at least one input variable, the control application circuit comprising at least one of the following:

(i) an input for receiving an input signal, the control application circuit being configured to generate the pulsed control application signal such that the pulsed control application signal has a frequency dependent on the input signal present at the input; and (ii) an output for sending an output signal, the control application circuit being configured to generate the output signal such that the output signal has a frequency that depends on a frequency of the pulsed control application signal.

2. The confocal laser scanning microscope according to claim 1, the control application circuit being configured so that it can generate the pulsed control application signal with different pulse amplitudes for successive pulses of the pulsed control application signal.

3. The confocal laser scanning microscope according to claim 1, the control application circuit being configured so that it can generate the pulsed control application signal with different pulse widths for successive pulses of the pulsed control application signal.

4. The confocal laser scanning microscope according to claim 1, having a measurement device that is connected to the input and is configured so that it senses a measured light, proceeding from the sample, at a scanning frequency, and provides the input signal to the input, wherein the input signal has a frequency defined by the scanning frequency, the control application circuit being configured so that it generates the pulsed control application signal at a frequency dependent on the input signal present at the input.

5. The confocal laser scanning microscope according to claim 1, having a measurement device that is connected to the output and is configured so that it senses a measured light, proceeding from the sample, at a scanning frequency dependent on the frequency of the pulsed control application signal.

6. The confocal laser scanning microscope according to claim 1, the control application signal being configured so that it receives a target value for a light intensity or light quantity as the at least one input variable.

7. The confocal laser scanning microscope according to claim 1, the control application circuit comprising a memory device in which at least one correlation between pulse amplitude, pulse width, and the at least one input variable is stored and/or storable.

8. A method for adjusting a light intensity of a laser light source of a confocal laser scanning microscope, wherein the laser light source illuminates a sample observed by the confocal laser scanning microscope, the method comprising the steps of:
    supplying the laser light source with a pulsed control application signal, both a pulse amplitude and a pulse width of at least one pulse of the pulsed control application signal being specified as a function of at least one input variable; and
    sensing a measured light proceeding from the sample at a scanning frequency specified as a function of a frequency of the pulsed control application signal.

9. The method according to claim 8, wherein the frequency of the pulsed control application signal is an integral multiple of the scanning frequency.

10. A method for adjusting a light intensity of a laser light source of a confocal laser scanning microscope, wherein the laser light source illuminates a sample observed by the confocal laser scanning microscope, the method comprising the steps of:
    sensing a measured light proceeding from the sample at a scanning frequency specified as a function of at least one input variable; and
    supplying the laser light source with a pulsed control application signal having a frequency specified as a function of the scanning frequency.

11. The method according to claim 10, wherein the frequency of the pulsed control application signal is an integral multiple of the scanning frequency.

\* \* \* \* \*